United States Patent [19]

Kristan

[11] Patent Number: 4,959,146
[45] Date of Patent: Sep. 25, 1990

[54] REMOTELY OPERATED SUBMERSIBLE UNDERWATER SUCTION APPARATUS

[76] Inventor: Louis L. Kristan, 2111 Brentwood Dr., Idaho Falls, Id. 83402

[21] Appl. No.: 146,506

[22] Filed: Jan. 21, 1988

[51] Int. Cl.$^5$ .............................................. B01D 29/10
[52] U.S. Cl. ..................... 210/237; 210/169; 210/232; 210/258; 210/416.1; 15/1.7; 252/631; 376/310
[58] Field of Search ............... 210/167, 169, 172, 232, 210/237, 238, 241, 258, 416.1, 416.2, 435; 15/1.7; 252/631; 376/260, 310

[56] References Cited

U.S. PATENT DOCUMENTS

| | | | |
|---|---|---|---|
| 3,755,843 | 9/1973 | Goertzen, III et al. | 15/1.7 |
| 3,868,739 | 3/1975 | Hargrave | 15/1.7 |
| 3,886,616 | 6/1975 | Hayes | 15/1.7 |
| 4,061,480 | 12/1977 | Frye et al. | 55/356 |
| 4,154,680 | 5/1979 | Sommer | 210/169 |
| 4,240,173 | 12/1980 | Sherrill | 15/1.7 |
| 4,304,022 | 12/1981 | Sommer | 15/1.7 |
| 4,374,024 | 2/1983 | Peloquin et al. | 210/241 |

Primary Examiner—Peter Hruskoci
Assistant Examiner—Christopher Upton

[57] ABSTRACT

A completely submersible, remotely operated underwater suction device for collection of irradiated materials in a nuclear pool is disclosed. The device includes a pump means for pumping water through the device, a filter means for capturing irradiated debris, remotely operated releasable connector means, a collection means and a means for remotely maneuvering the collection means. The components of the suction device may be changed and replaced underwater to take advantage of the excellent radiation shielding ability of water to thereby minimize exposure of personnel to radiation.

10 Claims, 3 Drawing Sheets

REMOTELY OPERATED SUBMERSIBLE UNDERWATER SUCTION APPARATUS

FIELD OF THE INVENTION

The present invention relates to a completely submersible, remotely operated suction device for underwater collection of irradiated debris found in water in a nuclear pool.

BACKGROUND OF THE INVENTION

Nuclear reactors for experimentation, power production and other purposes have been in operation within the U.S. and other countries for many years. Such nuclear reactors usually include a water pit or nuclear pool associated with them in some way.

Through years of use, a water pit or nuclear pit accumulates a layer of dirt and debris on the bottom and sides thereof. This dirt and debris can be attributed to chips from cutting operations, the dropping of small items into the pool, general dirt from the atmosphere, and other items which somehow get into the nuclear pool. This debris affects operations in the pool in a number of ways. The debris increases the activity of the pool water by adding additional nuclear material thereto. Also, the debris reduces the visibility which affects the work being performed in the nuclear pool. Further, if a small item is dropped in the pool, it is hard to find and retrieve as a result of debris in the pool.

Previous methods of nuclear pool cleaning include the use of brushes and dust pans attached to probe poles. This method is not only slow and inefficient, but it also reduces the visibility in the nuclear pool during cleaning by stirring up the silt which had settled out of the water. Other methods have suction equipment mounted out of the water, and vacuum equipment used in the water. The mounting of suction equipment outside of the water, however, increases exposure of personnel to nuclear material and creates problems with disposal of nuclear debris.

One such vacuum for a nuclear pool having suction equipment mounted out of the water is disclosed in U.S. Pat. No. 4,374,024 issued Feb. 15, 1983. This device includes injection and suction tubes and a removable, disposable filter for capturing the irradiated materials. Pressurized water is injected into the suction tube through a jet pump nozzle to establish a suction flow through the tube. The suction device is manually positionable by an operator standing at a cry location who extends the device underwater by maneuvering a positioning pole. The pole is pivotally connected to the injection or suction tube by a variable position latching mechanism. The source of pressurized water which is injected into the suction tube is mounted outside of the nuclear pool. As a result, contaminated water must be circulated out of the pool through the source of pressurized water and back into the pool thereby causing exposure of the operator and other persons in the vicinity to nuclear contamination. In addition, the filter means, which is outside the pool, must be discarded and replaced by a new filter means when it becomes full of debris. This also results in unnecessary exposure of the operator to active nuclear material.

An example of a vacuum cleaner for collecting radioactively contaminated particles located in the air is disclosed in U.S. Pat. No. 4,061,480 issued Dec. 6, 1977. This apparatus uses suction to draw radioactive particles through a high efficiency filter which contains the filtered particles in a disposable bladder filter unit for subsequent disposal. The bladder filter unit prevents the escape of filtered radioactive particles to the ambient atmosphere during the operation of the apparatus as well as during disposal. This apparatus is not designed for use in underwater environments.

An example of a conventional pool vacuum apparatus is disclosed in U.S. Pat. No. 3,868,739 issued March 4, 1975. This portable pool vacuum apparatus is designed to move along the bottom of the pool and to draw water and debris through a vacuum head into a filtration chamber within the casing. The water is passed through a plurality of spaced apart cartridge filters and into a manifold-type chamber. The water is then drawn into a pumping apparatus and discharged exteriorly thereof back into the swimming pool. This apparatus is not designed for cleaning nuclear pools and as a result does not include shielding to protect the user from nuclear contamination. Moreover, to change the filters the user must remove the vacuum apparatus from the water and open the casing to the apparatus and physically remove the filters therefrom. Cleaning of the vacuum in this manner would result in dangerous exposure of the operator to radioactive material were such a device used in a nuclear pool.

Another example of a submersible swimming pool cleaner is disclosed in U.S. Pat. No. 3,886,616 issued June 3, 1975. This apparatus relates to a hand-propelled swimming pool cleaner comprising a wheeled frame having a motor driven pump mounted thereon. The pump is adapted to pick up dirt particles or the like from the pool floor and pump the same through a filter to remove the particles from the water. An elongated handle is secured to the cleaner to permit a person at poolside to manually maneuver the cleaner to clean the bottom of the pool. This swimming pool cleaner is not adapted to be permanently submerged in a swimming pool. In addition, to clean this apparatus one must remove it from the pool and manually remove the filters therefrom. Again, this will result in operator exposure to any radioactive materials which may have been collected in the filter of the vacuum.

U.S. Pat. No. 4,154,680 issued May 15, 1979 describes a cleaning implement for swimming pools. This apparatus has a chassis with traction drive and a suction pump mounted on the chassis. A suction nozzle is connected to the suction side of the pump for drawing in settled particles. A filter is connected to the pressure side of the pump for catching the particles. A controlled diving cell which is floodable and clearable in a controlled manner is arranged on the chassis for varying the buoyancy to the apparatus sufficiently to raise and lower it in the water. This device is not useful in the cleaning of nuclear pools since in order to clean this device one must open the housing and manually remove the filter. Manual removal of the filter will, in turn, expose the operator to radioactive contamination.

U.S. Pat. No. 4,240,173 issued Dec. 23, 1980 describes a pool vacuum including an elongated pipe section having a flattened debris pick-up end and a discharge end for discharging debris into a bag which is removably attached to the pipe section. Intermediate the ends of the elongated pipe section is a larger pipe section which is spaced from and sealed to the elongated pipe section to form a fluid discharge chamber surrounding the elongated pipe section. Apertures are formed between the chamber and the discharge end of the elongated pipe section to direct fluid applied under pressure to the chamber rearwardly through the elongated pipe section. This creates a partial vacuum for causing debris located near the pick up end of the elongated pipe section to be sucked up and directed into the bag whenever fluid under pressure is applied to the chamber. This vacuum suffers from several disadvantages which limit its usefulness for cleaning of nuclear pools. First, to clean the bag it must be physically removed from the vacuum apparatus outside of the water thereby resulting in exposure of the operator to radioactive material. Second the source of pressurized water is mounted outside of the pool and requires circulation of the pool water therethrough. As a result, this suction apparatus would expose the operator to radioactive material since nuclear pool water is contaminated with radioactive material.

Another underwater cleaning apparatus is disclosed in U.S. Pat. No. 4,304,022 issued Dec. 8, 1981. This underwater cleaning apparatus includes a chassis having a caterpillar track and a tapered flow duct below the chassis. The flow duct forms lateral openings between a cleaning brush and the tracks and is connected through an opening to a suction duct of a suction pump which conveys the sucked up liquids with the contaminents contained therein into a filter. Due to the increased flow velocity, the static pressure in the flow duct is reduced, so that the chassis is pressed onto the bottom surface of the pool and can overcome severe gradients without sliding. This vacuum is not adapted for cleaning of nuclear pools since the filter means must be manually removed outside of the water to be cleaned causing exposure of the operator to radioactive material.

Yet another pool vacuum system is disclosed in U.S. Pat. No. 3,755,873 issued Sept. 4, 1973. This pool vacuum system includes housing in the form or a canister enclosing a filtration element therein which is directly attachable to a vacuum head by a flexible tube. A pump is disposed in the canister along with a power source for moving the water from the vacuum head through the filter unit. This device may be remotely operated from outside of the swimming pool, however, it must be removed from the pool in order to clean or replace the filter means. Therefore, this system is not adaptable to nuclear pools since it will result in unnecessary exposure of the operator to radioactive material during cleaning and replacement of the filter means.

SUMMARY OF THE INVENTION

The present invention relates to a completely submersible, remotely operated suction device for underwater collection of irradiated debris found in water in a pool comprising a submersible pump means for pumping the water in the pool, the pump means having an inlet and an outlet; a submersible filter means for capturing irradiated debris in the water pumped by the pump means, the filter means including an inlet and an outlet; a remotely operated releasable connector means for releasably connecting the outlet of the filter means to the inlet of the pump means; a flexible suction tube means for receiving irradiated debris having an inlet and an outlet; a remotely operated releasable connector means for releasably connecting the suction tube means to the inlet of the filter means; means for maneuvering the inlet of the suction tube means in a pool of water; and means for remotely removing the irradiated debris from the filter means while the filter means is underwater.

It is the primary object of the present invention to provide a cleaning apparatus which will clean the floors of nuclear pools quickly and efficiently with minimum exposure of personnel to radioactive material as well as a low potential for the spread of radioactive contamination.

It is another object of the present invention to provide a completely submersible, remotely operated suction device for underwater collection and disposal of irradiated materials.

It is a still further object of the present invention to provide a completely submersible, remotely operated suction device wherein the filter means may be removed and replaced underwater by an operator outside of the pool.

It is a still further object of the present invention to provide a completely submersible, remotely operated suction device having interchangeable vacuum heads for cleaning not only the floor of the pool but the hard to reach corners and shelves as well.

It is a still further object of the present invention to provide a completely submersible, remotely operated suction device wherein the entire assembly may be moved underwater from pool to pool through the use of a bridge between the pools.

It is a still further object of the present invention to provide a completely submersible, remotely operated suction device having a stationary pump and stationary filters and moveable vacuum heads.

These and other objects of the present invention will be apparent to one of ordinary skill in the art from the summary and detailed description which follow.

DETAILED DESCRIPTION OF THE PREFERRED EMBODIMENTS

Figure 1:
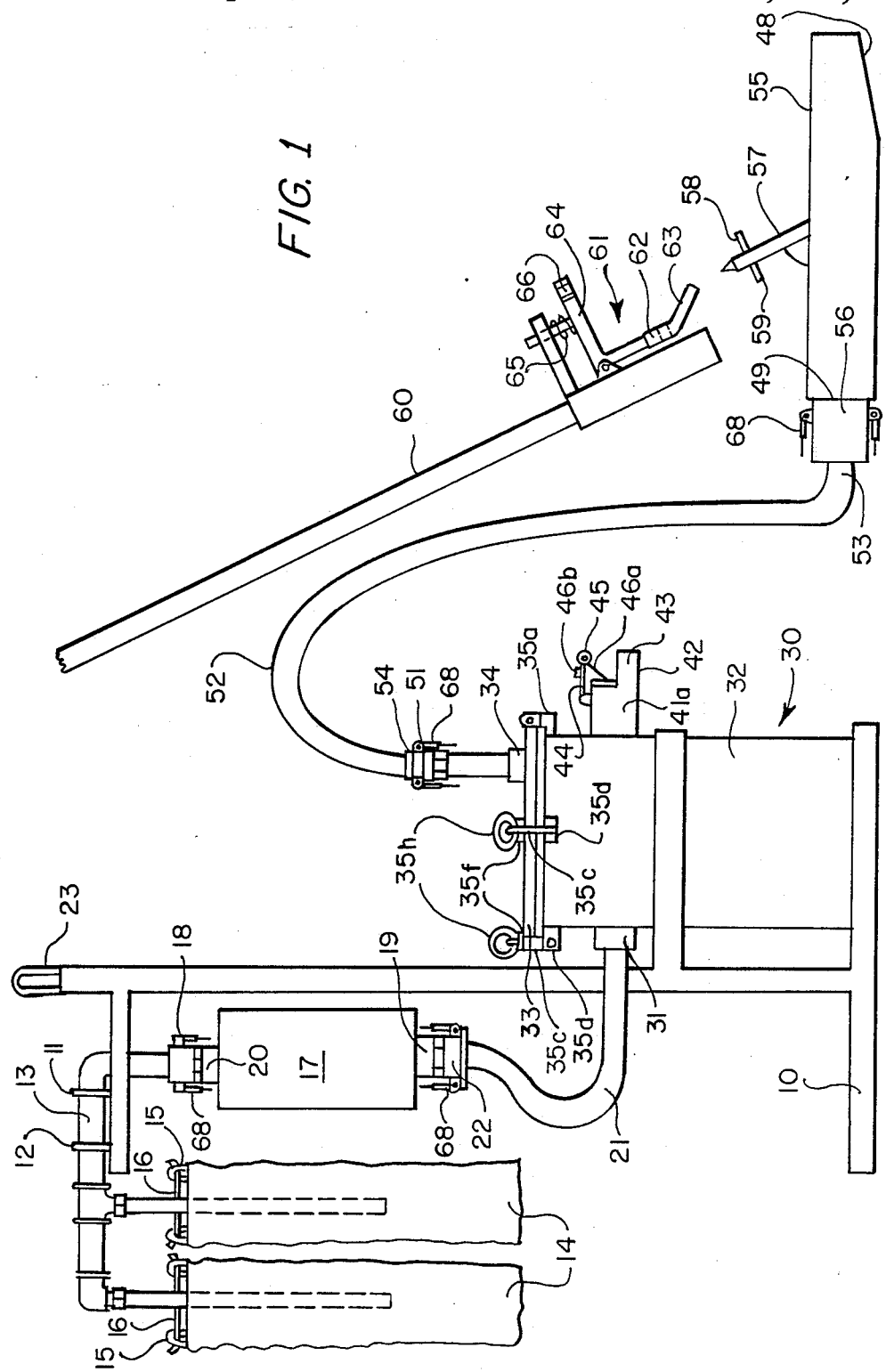
FIG. 1 is a diagrammatic front plan view of the underwater suction device of the present invention.

Referring now to FIG. 1, the apparatus of the invention includes a frame means 10 having a handle 23 at the top. Attached to the frame means 10 by a pair of U-bolts 11 and 12 is a double conduit 13. At the ends of the conduit 13 are mounted four skimmer bags 14. The skimmer bags 14 include rings 15 which hook over extending arms 16 attached to the conduit 13 to mount the skimmer bags 14 on the conduit 13. A submersible pump means 17 having an inlet 19 and an outlet 20 is releasably attached to the other end of the conduit 13 by a CAMLOC fastener 18 at the outlet 20 of the pump means 17. The inlet 19 is releasably attached to a hose 21 by a second CAMLOC fastener 22. Each CAMLOC fastener 18 and 22 includes a pair of levers 68 used to fasten and unfasten the fastener. The CAMLOC fasteners 18 and 22 are unlocked by rotating levers 68 about 90 degrees from their locked positions shown in FIG. 1.

The other end of the hose 21 is attached to an outlet 31 of a filter means 30. The filter means 30 is attached to the frame means 10 by suitable mechanical fasteners (not shown). The filter means 30 also includes a container 32 having a top 33 provided with an inlet 34. The top 33 is hingedly mounted to container 32 by a bracket 35a and suitable pin 35b. Top 33 is held on container 32 by suitable bolts 35c which are pivotally mounted to container 32 by brackets 35d and associated pins 35e. Bolts 35c are received in slots provided on flanges 35f which are attached to top 33. Suitable nuts 35g are received on bolts 35c to hold top 33 in place. Nuts 35g are remotely turnable by engaging rings 35h upstanding from nuts 35g. The filter means 30 is depicted in more detail in FIG. 2.

Fluidly connected to the inlet 34 of the filter means 30 by a third CAMLOC fastener 51 is a flexible hose 52 having an inlet 53 and an outlet 54. The outlet 54 of the flexible hose 52 is releasably connected to the inlet 34 of the filter means 30 by the CAMLOC fastener 51. The inlet 53 of the flexible hose 52 is releasably connected to an outlet 49 of a suitable collection means such as a wand 55 by a fourth CAMLOC fastener 56. The wand 55 also has an inlet end 48. The wand 55 additionally includes a protruding member 57 having a pair of arms 58 and 59 extending therefrom.

Also shown in FIG. 1 is a probe pole 60 having a latching device 61 on one end thereof. The latching device 61 includes a remotely operable means for engaging the arms 58 and 59 of the protruding member 57 in order to attach the probe pole 60 to the wand 55.

The remotely operable means for engaging the arms 58 and 59 embodied in the latching device 61 includes a slot (not shown) extending from the end of the probe pole 60 to a point under a locking device 62. The arm 58 fits into the slot and slides along a surface 63 until it reaches a hole (shown in phantom) in the locking device 62. As the arm 58 slides along the surface 63, it displaces the locking device 62 away from the probe pole 60 as a result of the force exerted by the arm 58. The locking device 62 is capable of moving since it is mounted on a spring arm 64 attached to a spring means 65. Spring arm 64 may also be actuated against the force of spring means 65 by the depressing of a spring actuator 66

Figure 2:
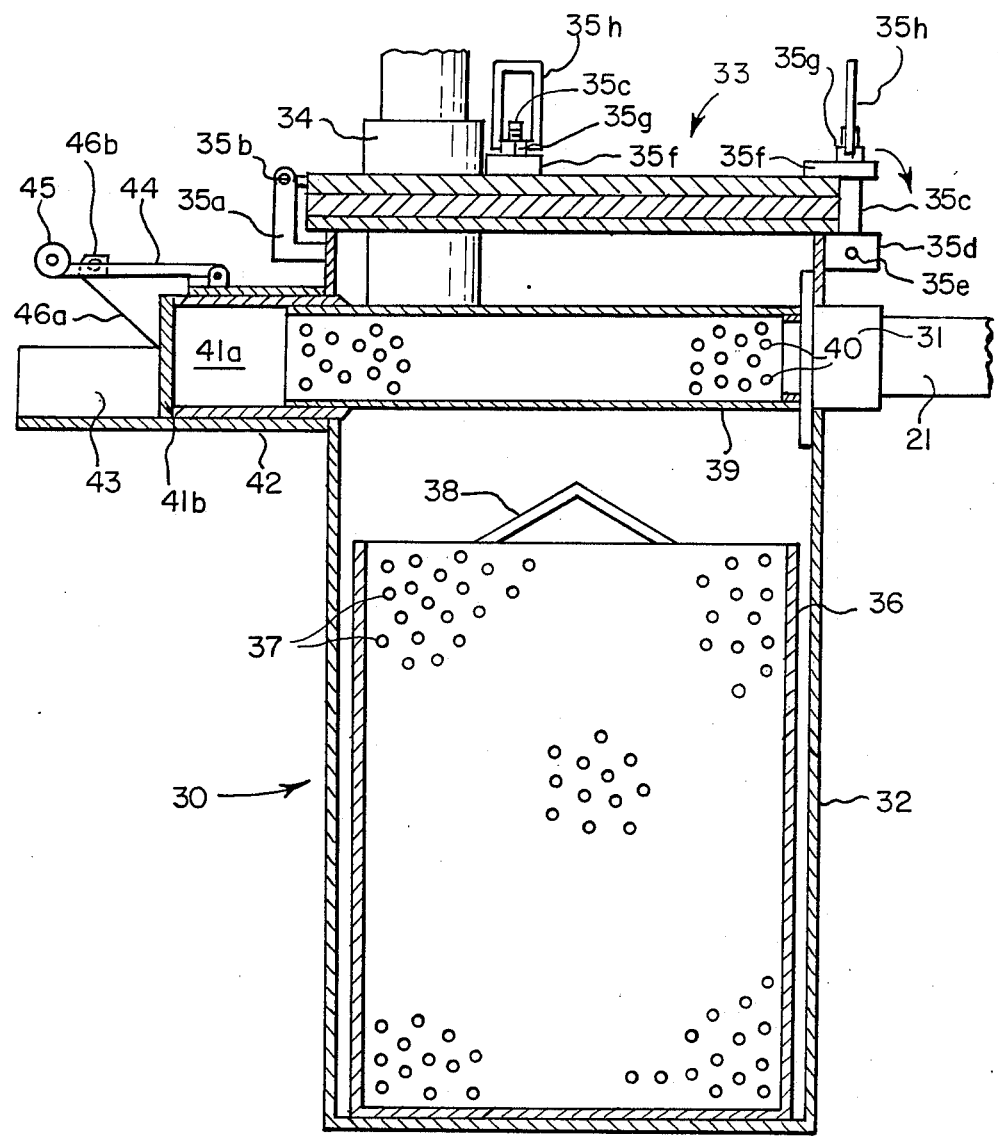
FIG. 2 is a cross-sectional rear view of the filter means of the present invention depicted in FIG. 1.

Referring now to FIG. 2, the filter means 30 is shown in more detail. Located inside the housing 32 is a remotely removable basket 36 having a plurality of perforations 37 therein and a handle 38 attached thereto. Also located inside the housing 32 is a cylindrical strainer 39 having a plurality of perforations 40 therein. One end of the cylindrical strainer 39 is fluidly connected to the outlet 31 of the filter means 30 and the other end of the cylindrical strainer 39 is sealed off by a cylindrical section 41a having an end plate 41b. The strainer 39 is slidably mounted in a hollow cylindrical guide 42 attached to container 32. Guide 42 has an extended end 43 which is crescentshaped. Releasably attached to the guide 42 is a slotted lever 44 having a ring 45 thereon. The lever 44 engages an arm 46a attached to the end plate 41b of the strainer 39 to hold strainer 39 in place. Arm 46a includes an aperture 46b.

Figure 3:
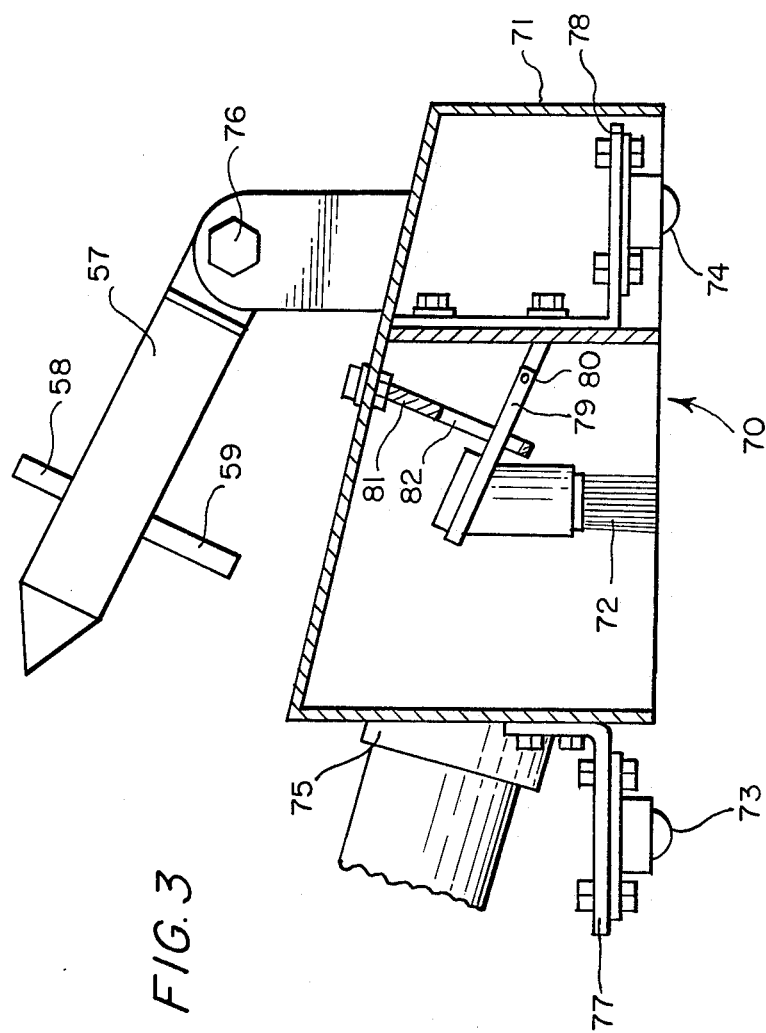
FIG. 3 is a cross-sectional front view of an alternative releasably attachable pickup head of the invention.

Referring now to FIG. 3, an alternative collection means in the form of a releasably attachable pickup head 70 for use with the present invention is shown. Pickup head 70 is useable in place of wand 55 by suitably attaching CAMLOC fastener 56 to an outlet 75 of pickup head 70. The pickup head 70 includes a housing 71, a brush 72, and a pivotal mount 76 for arm 57. Pairs of front wheels 74 and back wheels 73 (only one of which are shown) are located on opposite lateral sides of pickup head 70. The wheels 73 and 74 are attached to the housing 71 by plates 77 and 78, which are suitably bolted to the housing 71. The brush 72 is attached to the housing 71 by an arm 79 which includes a hinge 80 so that the brush 72 exerts force on the floor to stir up dirt and thereby improve cleaning. To prevent the brush 72 from falling into an inoperable position if the pickup head 70 is lifted off the floor, the brush 72 is also attached to the housing 71 by a second arm 81 having a slot 82 therein. The slot 82 allows up and down movement of the brush 72 by allowing hinged arm 80 to slide up and down in the slot 82.

In operation, the frame means 10 having the vacuum apparatus mounted thereon is placed on the floor of a nuclear pool at the desired location. The outlet 54 of the hose 52 is then attached to the inlet 34 of the filter means 30 by the CAMLOC fastener 51. Finally the inlet 53 of the hose 52 is attached to the desired pickup head 70 (or wand 55) and the vacuum apparatus is ready for use. The pump means 17 is connected to a suitable power source (not shown) such as an electrical outlet.

The vacuum apparatus begins operation as a result of turning on the submersible pump means 17. The pump means 17 causes a flow of pool water into the pickup head 70 through the outlet 75 into the hose 52 to the filter means 30. Water flowing into the filter means 30 is released inside the housing 32 above the basket 36 and outside the strainer 39. The pump means 12 applies suction to the outlet 31 of the filter means 30 which draws the water through the strainer 39. The strainer 39 prevents larger debris from leaving the filter means 30. Larger debris which will not pass through the perforations 40 in the strainer 39 falls into the basket 36 where it is accumulated. The perforations 37 in the basket 36 are present to allow the operator to lift the basket 36 up out of the housing 32 and through the pool when cleaning the basket 36.

The water continues to flow from the outlet 31 of the filter means 30 to the pump means 17 carrying with it any small debris which passed through the perforations 40 in the strainer 39. The pump means 17 then pumps the water into the conduit 13 and finally through the permeable skimmer bags 14 and back into the pool. The skimmer bags 14 are permeable to water but impermeable to some of the smaller debris not collected by the filter means 30. Accordingly, the skimmer bags 14 act as a second filter to collect small debris such as silt. The skimmer bags 14 are preferably made from felt such as 15 oz. Dacron felt.

The pickup head 70 is like a vacuum cleaner attachment which has a brush 72 therein to stir up debris on the pool floor and cause it to be sucked into the outlet 75. The pickup head 70 is rollable along on the pool floor on wheels 73 and 74. In addition, the pickup head 70 includes a pivotal mount 76 which allows the user to move the pickup head 70 along the pool floor by adjusting the angle of connection between the probe pole 60 and the pickup head 70. The wand 55 is used for corners and hard-to-reach places in place of pickup head 70. The wand 55 sucks water and debris through the inlet 48 at one end thereof.

All of the CAMLOC fasteners 18, 22, 51 and 56 can be operated by an operator outside of the pool. This is accomplished through the use of a suitable tool which is long enough to reach into the water and grasp each CAMLOC fasteners 18, 22, 51 and 56. The CAMLOC fasteners 18, 22, 51 and 56 are fastened and unfastened by grasping the levers 68 and moving them 90°.

To operate the vacuum apparatus, the operator grasps the probe pole 60, which remains partially submerged at all times, and connects it to the protruding member 57 of the pickup head 70 which is attached to the hose 52. To make this connection, the operator aligns the slot in probe pole 60 with the arms 58, 59 and slides the latching device 61 over the arms 58, 59. As this occurs, arm 58 contacts surface 63 and displaces locking device 62 away from probe pole 60 until arm 58 enters the hole (shown in phantom) in the locking device 62. At this point, the locking device 62 returns to its original position adjacent the probe pole 60 and locks the arm 58 in the hole. To disengage the pickup head 70 from the probe pole 60, the operator uses a suitable tool to move the spring actuator 66 towards the probe pole 60, thereby compressing the spring means 65 and displacing the spring arm 64. Displacement of the spring arm 64 moves the locking device 62 away from the probe pole 60 and disengages the arm 58 from the hole in the locking device 62. The probe pole 60 is then moved away from the pickup head 70 and the spring actuator 66 is released to return the latching device 61 to its original position via the action of the spring means 65.

Once the probe pole 60 is attached to the pickup head 70, the pump means 17 is turned on to create flow from the pickup head 70 through the hose 52, the filter means 30, the pump means 17 and the skimmer bags 14. The operator then maneuvers the pickup head 70 throughout the nuclear pool to vacuum the pool. As the pool water flows through the apparatus the filter means 30 collects the large debris and the skimmer bags 14 collect the finer debris. The water is returned to the pool through the permeable skimmer bags 14. The operator may stop and switch from the pickup head 70 to the wand 55 at any time without taking the apparatus out of the water.

After a period of use, the filter means 30 and the skimmer bags 14 begin to fill up with debris and need to be cleaned or replaced. To replace the skimmer bags 14, the operator grasps the rings 15 and slides them off the extending arms 16. The bags 14 are suitably discarded and replaced by a new set of bags 14. The skimmer bags 14 are mounted by grasping the rings 15 and sliding them over the extending arms 16.

To clean the filter means 30 the operator remotely grasps the ring 45 and pulls upwardly. This releases arm 46a so that arm 46a is then grasped through aperture 46b to cause the strainer 39 to slide laterally along the cylindrical guide 42 to the open end 43. The strainer 39 is then suitably grasped and completely removed from the filter means 30 for cleaning or replacement. To replace the strainer 39, the strainer 39 is slid back into the cylindrical guide 42 along the open end 43. The arm 46a is then held in place as lever 44 is returned to its working position as shown in FIG. 2.

The basket 36 is also remotely removable for cleaning and replacement. To remove the basket 36 from the housing 32, the strainer 39 is first removed as discussed above. Next, the top 33 is moved out of the way by turning the rings 35h attached to nuts 35g until bolts 35c can be pivoted away from holding flanges 35f. Finally, top 33 is pivoted about pin 35b to move top 33 out of the way. The basket 36 is then grasped by the handle 38 and lifted out of the housing 32. The basket 36 is preferably dumped into an underwater disposal area and then returned to the housing 32. The top 33 is replaced and the strainer 39 is put back into its working position.

The pump means 17 may be replaced underwater if it should fail. To replace the pump means 17 one simply unfastens the CAMLOC fasteners 18 and 22, removes the pump means 17 and replaces it with a new pump means 17. The hose 52 is also easily replaced in the same manner, if necessary.

The entire vacuum apparatus is movable from one water pit to an adjacent water pit using a water pool work bridge. To move the apparatus, the frame 10 is grasped by the handle 23 and the apparatus is lifted off the pool floor and moved to the desired location. The apparatus may remain completely submerged throughout this operation. The length of the probe pole 60 is varied as desired by attaching extensions to the end of the probe pole 60 which is outside the pool. From the foregoing description it is apparent that the components of the vacuum apparatus can be changed or replaced underwater thereby minimizing the radiation exposure to personnel associated with operation of the vacuum. The invention exploits the excellent shielding ability of the pool water to minimize operator radiation exposure. Also, since all debris and components are disposed of underwater, special handling or additional packaging and shielding will not be required for proper disposal. The use of the water as shielding also allows larger volume filters to be used and thus increases the time between filter changes.

Various alterations and modifications of the present invention will be apparent to one of ordinary skill in the art from the foregoing description. Accordingly, the scope of the invention not to be limited by the embodiments described above and shall be determined from the claims which follow.

What is claimed is:

1. A completely submersible, remotely operated suction device for underwater collection of irradiated debris found in water in a nuclear pool comprising:
   a submersible pump means for pumping the water in the pool, said pump means having an inlet and an outlet;
   a submersible filter means or capturing irradiated debris in the water pumped by said pump means, said filter means including an inlet and an outlet;
   a remotely operated releasable connector means for releasably connecting said outlet of said filter means to said inlet of said pump means;
   a submersible collection means for collecting irradiated debris having an inlet and an outlet;
   a remotely operated releasable connector means for releasably connecting said outlet of said collection means to said inlet of said filter means:
   means for maneuvering said inlet of said collection means in the pool of water; and
   means for remotely removing the irradiated debris from said filter means while said filter means is underwater.

2. A device as claimed in claim 1 wherein said filter means comprises a remotely removable perforated basket for collecting large debris.

3. A device as claimed in claim 2 wherein said filter means further comprises a strainer which is located over said outlet of said filter means for preventing large debris from leaving said basket.

4. A device as claimed in claim 1 further comprising at least one fine submersible filter fluidly attached to said pump means downstream of said filter means for capturing small debris.

5. A device as claimed in claim 4 wherein said fine submersible filter comprises at least one skimmer bag attached to said outlet of said pump means.

6. A device as claimed in claim 1 wherein said collection means comprises
   a flexible suction hose; and a remotely operated releasably attachable pickup head for cleaning floors of water pools.

7. A device as claimed in claim 6 wherein said pickup head comprises a brush to aid in cleaning pool floors.

8. A device as claimed in claim 1 further comprising a frame means on which said pump means and said filter means are mounted, said frame means being provided with a handle portion for permitting said pump means and said filter means to be remotely movable as a unit.

9. A device as claimed in claim 1 wherein said means for maneuvering comprises a long extension handle and a releasable attachment means for attaching said handle to said collection means.

10. A device as claimed in claim 1 wherein said collection means comprises
- a flexible suction hose releasably connected to said inlet of said filter means; and
- a remotely operated releasably attachable wand connected to said flexible suction hose for cleaning corners and other hard-to-reach places.

* * * * *